Dec. 10, 1963     E. V. HARDWAY, JR., ETAL     3,113,448
METHOD FOR PRECISE VOLUME DETERMINATION
Filed Jan. 12, 1961                                  2 Sheets-Sheet 1

Edward V. Hardway, Jr.
Eldon E. Crump
INVENTORS

BY
ATTORNEYS

Dec. 10, 1963   E. V. HARDWAY, JR., ETAL   3,113,448
METHOD FOR PRECISE VOLUME DETERMINATION
Filed Jan. 12, 1961   2 Sheets-Sheet 2

Edward V. Hardway, Jr.
Eldon E. Crump
INVENTORS

BY Browning, Simms, Hyer
& Echevarria

ATTORNEYS

United States Patent Office 3,113,448
Patented Dec. 10, 1963

3,113,448
METHOD FOR PRECISE VOLUME
DETERMINATION
Edward V. Hardway, Jr., and Eldon E. Crump, Bellaire, Tex., assignors to Beckman Instruments, Inc., a corporation of California
Filed Jan. 12, 1961, Ser. No. 95,766
8 Claims. (Cl. 73—1)

This invention relates to a method for determining the volume of a material and, more particularly, it relates to a method for operating a comparison pycnometer to accurately calibrate the same and to correct zero or additive errors which may develop, all without requiring exact measurement or knowledge of the volumes involved in the apparatus or of the cause of any errors which appear.

The type of comparison pycnometer here involved operates on the thermodynamic principle that two identical fluids or gases at the same temperature and pressure will have equal specific volumes. Thus, by changing the volume of a gaseous reference system by a fixed amount and then measuring the change in volume necessary in a second gaseous system containing an unknown volume to maintain the specific volume of the gas in the second system equated with that of the first system, the amount of change can be used to determine the unknown volume. For example, a comparison pycnometer can comprise two variable volume chambers, one of which is a reference chamber and the other a sample chamber. If gases in the two chambers originally have specific volumes which have a certain relationship to each other, such as being equal, and then when the volume of the reference chamber is changed by a predetermined amount, the amount of change in volume in the sample chamber necessary to re-establish the predetermined relationship between the specific volumes of the gases in the two chambers becomes a measure of the actual or absolute volume of the sample in the sample chamber.

Heretofore, it has been believed necessary to accurately know the volumes of the two chambers in order to accurately determine the volume of a sample. To accurately determine these volumes, it was necessary either to hold very close machine tolerances which could not be held in any practical manufacturing operation or to permit reasonable tolerances and then accurately measure the chamber volumes. This too was not practical. Moreover, even if such proportional errors could be reduced so that the desired degree of accuracy could be initially obtained, there was experienced a degree of volume instability or zero error brought about by use over prolonged periods in different environments because of wear, selective adsorption, changes of volume with temperature and because of the volume error equivalent of imbalance in relative humidity between the sample and the reference chambers of the apparatus. Additionally, other small zero errors of unexplained origin, which are equivalent to small changes in volume, have been encountered and in many cases, their appearance has been erratic.

It is accordingly an object of this invention to provide a method for operating a comparison pycnometer and particularly for calibrating and eliminating zero or drift errors without requiring exact measurement or knowledge of the volumes involved in variable volume chambers of the pycnometer or the cause of any errors which may appear.

Another object is to provide such a method which permits calibration for zero error correction by what may be termed a one shift method, thereby eliminating the cut-and-try methods which have been used, though unsatisfactorily, in the prior art.

Another object is to provide such a method which makes it possible to attain a volume measurement accuracy far beyond that which might be practical to control in design or manufacture or to maintain under different operating conditions.

Another object is to provide a method by which zero errors in a comparison pycnometer can be corrected in a very simple manner.

Other objects, advantages and features of the invention will be apparent from a consideration of the specification, claims and drawings wherein:

FIG. 3 is a side view of the apparatus of FIG. 2 and here again, parts of the apparatus have been broken away and sectioned to better illustrate the interior construction.

Like characters will be used throughout the several views to designate like parts.

Figure 1:
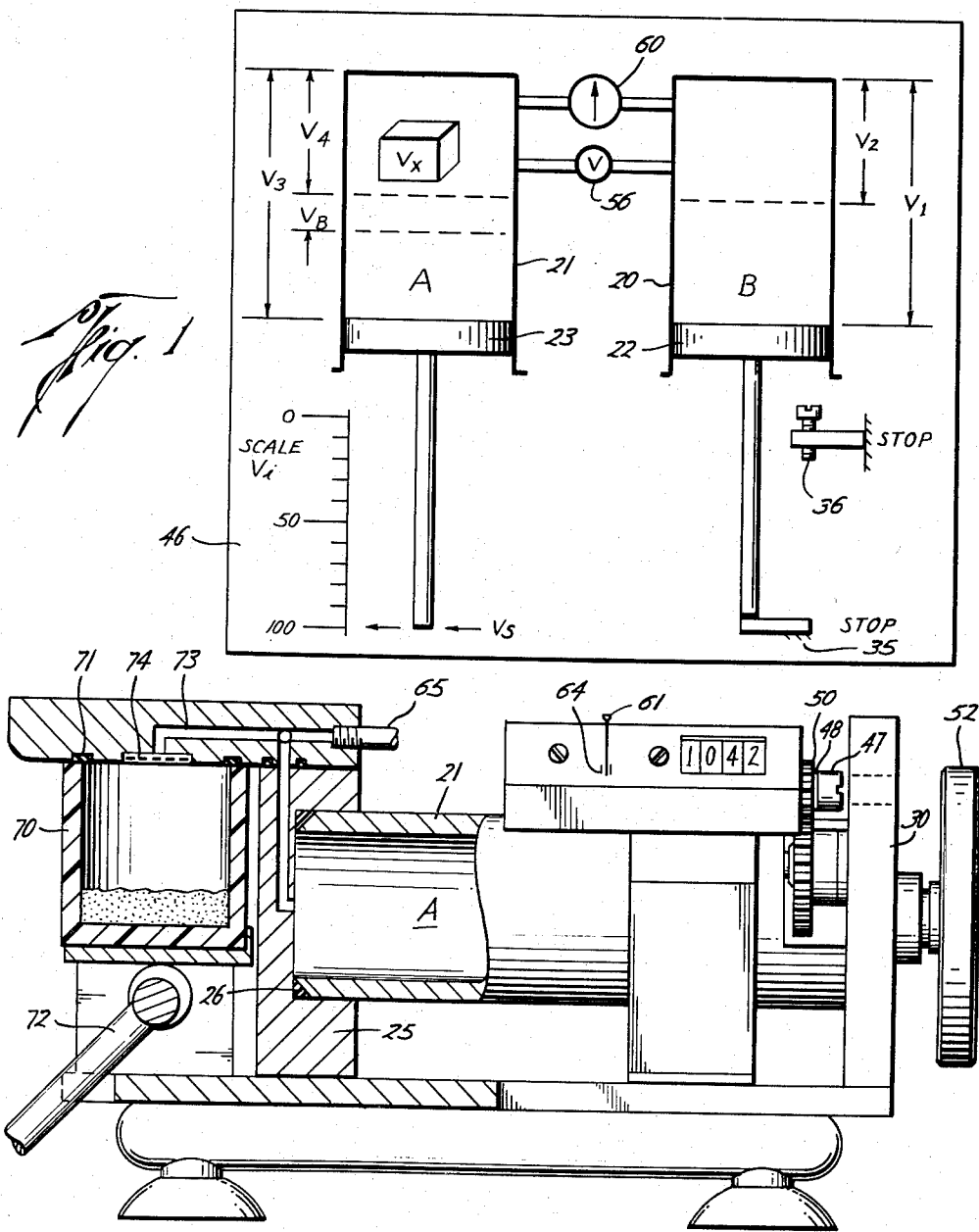
FIG. 1 is a schematic view which will be used to explain the principle upon which the method of the invention is based.

Before turning to a detailed description of the apparatus or the calibration or zero correction methods, a general description will be given of the principle upon which the apparatus of this invention works. Thus, referring to FIG. 1, the apparatus generally comprises two chambers designated by the letter "A" for the sample chamber and the letter "B" for the reference chamber for establishing a reference pressure. The two chambers are interconnected by a suitable conduit which includes a valve 56. Means are provided for sensing any differential of pressure between the two chambers and this means is schematically illustrated at 60. As herein shown, the two chambers comprise cylinders 20 and 21 containing, respectively, pistons 22 and 23. Movement of piston 22 is limited by stops 35 and 36, at least the latter of which is adjustable for purposes later described. Piston 23 is likewise movable and the extent of this movement can be determined from a scaling means or device 46 so that the scale reading is a function of the change in volume of the sample chamber A due to movement of piston 23.

Let us first assume an ideal condition in which the instrument is in perfect calibration and the gas in both chambers before and after compression is allowed to reach instrument temperature. Then if valve 56 is opened so as to equalize the pressures between the chambers and then closed, it will be evident that specific volume of gas in one chamber is equal to the specific volume of that in the other chamber. Then if piston 22 is moved upwardly until stop 36 is reached, it will be seen that the piston will sweep through a volume equal to $V_1$ minus $V_2$. Similarly, if we move piston 23 upwardly until the pressures are again balanced, it will sweep through a volume of $V_3$ minus $V_4$. At this point, piston 23 will be at the zero reading on scale 46. Then if both pistons are withdrawn to their original starting positions as shown in FIG. 1 and sample $V_x$ is inserted, and again valve 56 opened until the pressures and temperatures have equalized, valve 56 then can be closed and the pistons moved upwardly. It will be seen that due to the insertion of $V_x$, the length of movement of piston 23 will need to be less than when no sample is present in order to again equalize the pressure between the two chambers with piston 22 against stop 36. The difference in volume is indicated by $V_B$ and the scale reading $V_1$ will be at some value above zero having a definite relationship with the volume $V_x$. Usually, it will be preferred for a scale unit to be equal to a unit volume so that the sample volume can be read directly without conversion, but this can be otherwise if desired. It should also be pointed out that it is preferable that in order to obtain a scale unit of useable size, the scale unit be K times the actual volume change brought about by movement of the pistons. In a preferred embodiment, K is about 2. In order to show the relationship of the various volumes to K and to $V_i$ as well as $V_x$, the following is submitted.

An ideal condition is first assumed wherein the instrument is in perfect calibration and the gas or air in both chambers before and after compression is allowed to reach the instrument temperature. Certain terms are defined as below to correspond with these ideal conditions:

$V_1$ equals volume of chamber B before compression.

$V_2$ equals volume of chamber B after compression.

$V_3$ equals volume of chamber A before compression with the scale reading $V_s$ and the instrument calibrated.

$V_4$ equals volume of chamber A at a preselected zero point on the scale after compression.

$M_a$ equals mass of air or gas on sample side after valve is closed before, during and after compression.

$M_b$ equals mass of air or gas on reference side after valve is closed before, during and after compression.

$v_1$ equals specific volume (or volume per unit mass of air or gas on both sides before compression).

$v_2$ equals specific volume of air or gas on both sides after compression.

$V_s$ equals scale reading at start of test compression in terms of equivalent volume.

$V_x$ equals unknown sample volume.

When piston 22 has its rod against stop 35 and piston 23 is withdrawn to the $V_s$ position, valve 56 can be opened between the chambers for an interval and with the gas in both chambers at instrument temperature, the specific volumes of gas in each chamber must be equal. The same applies to the specific volume after compression and after the pressure is equalized by the operator. Thus, piston 22 can be moved upwardly until stop 36 is reached. Then piston 23, with no sample in the chamber, can likewise be moved upwardly until the differential pressure means 60 indicates the pressures have been equalized in the two chambers. Then, with no sample in the chamber A, the following relations become true by definition:

Before compression:

$$v_1 = \frac{V_3}{M_a} = \frac{V_1}{M_b} \quad (1)$$

After compression:

$$v_2 = \frac{V_4}{M_a} = \frac{V_2}{M_b} \quad (2)$$

and from the above, it follows that:

$$\frac{V_4}{V_3} = \frac{V_2}{V_1} \quad (3)$$

These proportions must exist if the differential pressure is zero after compression and it is assumed that the scale has been set to read zero when the volume of chamber A is $V_4$ and to read $V_s$ when the volume of the chamber is $V_3$.

If an unknown sample $V_x$ is inserted in the sample chamber and the process repeated, it will be evident that the piston on the sample side will move through a smaller stroke than it did in the absence of a sample to achieve a pressure balance. This difference in volume $V_B$ will add to $V_4$ to offset the reduced air volume resulting from the insertion of the sample. Therefore, repeating the process with the sample in the cup, we obtain:

$$v_1 = \frac{V_3 - V_x}{M_a} = \frac{V_1}{M_b} \quad (4)$$

$$v_2 = \frac{V_B + V_4 - V_x}{M_a} = \frac{V_2}{M_b} \quad (5)$$

Using the relation $V_1 V_4 = V_2 V_3$, we obtain the following:

$$V_B = \frac{V_1 - V_2}{V_1} V_x = \frac{V_3 - V_4}{V_3} V_x \quad (6)$$

From the above, it is evident that if changes in scale reading are related to changes in volume on the reference side by a constant K defined as:

$$K \triangleq \frac{V_1}{V_1 - V_2} \triangleq \frac{V_3}{V_3 - V_4} \cong \frac{\Delta V_i}{V_B} \quad (6a)$$

then $$V_i = K \frac{V_1 - V_2}{V_1} = K \frac{V_3 - V_4}{V_3} = V_x \quad (7)$$

Figure 2:
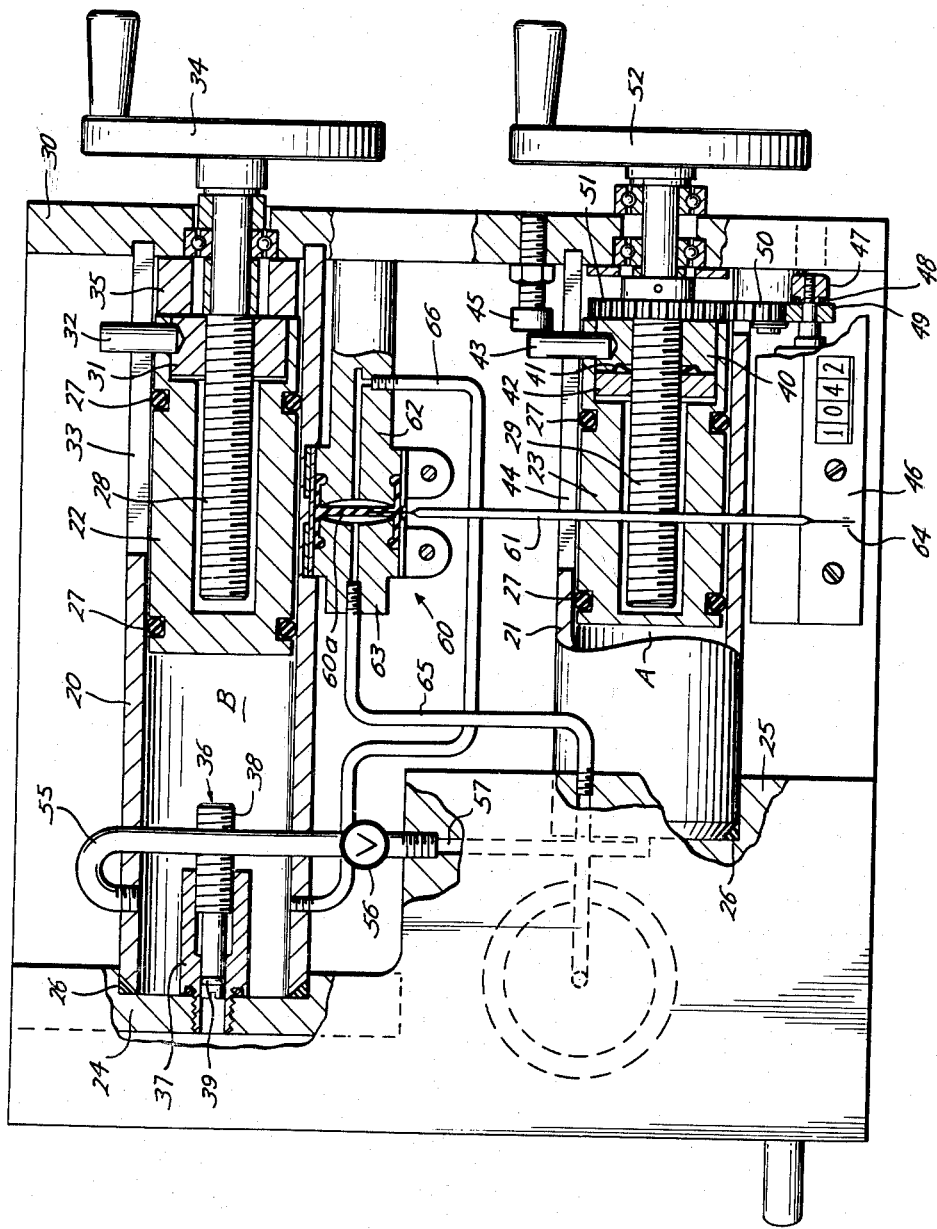
FIG. 2 is a plan view, a part of which has been broken away and horizontally sectioned to better illustrate the interior construction, of a preferred apparatus capable of carrying out the invention.

Turning now to a detailed description of the apparatus shown in FIGS. 2 and 3, chambers A and B are provided by cylinders 20 and 21 which are closed at one end by pistons 22 and 23 and at their other ends by insertion into blocks 24 and 25. Suitable seal means can be provided between the ends of the cylinder and the blocks as by rubber O-rings 26. Similarly, the pistons 22 and 23 can be provided with O-rings 27, the forward ones of which provide a seal while the hindmost ones provide a resilient support, keeping the pistons axially aligned with their cylinders.

Means are provided for independently advancing and retracting pistons 22 and 23 in their respective cylinders. Such means can include precision lead screws 28 and 29 journaled for rotation in end plate 30. A nut 31 is attached to piston 22, as by pin 32, and engages the thread of lead screw 28 to advance and retract the piston as the lead screw is rotated. The piston is prevented from rotating by pin 32 being disposed in a slot 33 in the cylinder. Thus, it will be seen that as handcrank 34 is turned, the piston can be advanced and retracted.

To limit rearward or retractive movement of the piston, a "fixed" stop 35, which can take the form of a replaceable ring, is provided at the rear of the piston to abut against plate 30. To limit movement of the piston in the other direction, an adjustable stop 36 is provided at the other end of the cylinder. This stop can include a mounting coupling 37 threaded into front plate 24 and receiving stop stud 38. The latter is threaded into coupling 37 so as to be adjustable lengthwise and it is sealed by suitable means such as O-ring 39 to prevent leakage. With this arrangement, it will be apparent that the movement of piston 22 is between two definite limits, one of which is adjustable.

The sample piston is provided with an anti-backlash nut 40 equipped with a Belleville spring 41 used in an arrangement similar to that shown on the reference side. Low backlash is very desirable in order to obtain accurate results if final settings are to be made from either direction. Here again, a pin 43 is provided to operate in slot 44 to prevent turning of the piston. The pin is also disposed to engage an adjustable stop screw 45 to approximately locate a starting position in use.

Means are provided for indicating the relative position of piston 23 in cylinder 21 so as to thereby indicate the volume in cylinder 21 swept by this piston. Such means can include a scaling device having a sliding scale such as a counter 46. The counter shaft is connected through an adjustable slip joint. The latter is shown as a slotted nut 47 secured to the counter shaft and having a frictional engagement with gear 49 via O-ring 48. The O-ring 48, or other suitable friction engaging means, provides sufficient frictional engagement between nut 47 and gear 49 so that the gear can drive the counter shaft through the O-ring and nut. On the other hand, such frictional engagement is such that it can be overcome by turning the nut 47 manually while holding the gear against turning to thereby adjust the position of the scale relative to that of the piston. In effect, this permits sliding of the scale so that different counter readings can be selected for any given position of the piston.

The gear 49 meshes with an idler gear 50 which in turn meshes with gear 51 secured to the lead screw 29. When the handcrank 52 is rotated, piston 23 is moved in and out, decreasing or increasing the volume of chamber A. The counter reading increases with the increasing volume.

Means are provided for equalizing the pressures between chambers A and B. In the illustrated form, a conduit 55 connects through a valve 56 to a tapped hole 57 leading to chamber A. Thus, with valve 56 open, pressures between the two chambers can equalize. It is also contemplated that instead of the arrangement shown, each chamber can have a separate valved outlet to the atmosphere or other source of common pressure for equalization purposes.

Means 60 are provided for indicating any pressure differential existing between chambers A and B. While such indicating means can take various forms, it is here illustrated as including a pressure indicator diaphragm 60a which is the web of an over-all H section of molded vulcanized latex. One end of pointer 61 is molded in the diaphragm. The diaphragm is mounted between two end pieces 62 and 63 which are recessed to limit the travel of the diaphragm and pointer to prevent damage. Extremely small differences in pressure are indicated by pointer 61 on the scale 64. As is evident, one side of the diaphragm is in communication via conduit 65 with chamber A and the other side via conduit 66 with chamber B.

As best shown in FIG. 3, means are provided for placing a sample in sample chamber A. Conveniently, such means can take the place of a removable cup 70 held in sealed position against seal 71 by an eccentric crank 72, the latter being movable to permit removal of the cup. The cup in turn is in communication with cylinder 21 via a passage 73 across a filter screen 74. Of course, it will be understood that the volume of chamber A is comprised not only of the effective volume cylinder 21 but also that of the sample cup and all connecting passages or conduits.

Calibration

In accordance with this invention, there is provided a method for calibrating a comparision pycnometer of the foregoing type which does not require either an accurate knowledge of the volumes involved ($V_1$, $V_2$, $V_3$, $V_4$) or a repeated cut-and-try operation, and yet the instrument can be quickly calibrated with extreme accuracy in a given environment. Also, other factors affecting exact proportionality need not be known or determined.

Thus, $V_1$, though not exactly known, is determined by a positive stop 35 and $V_4$ is chosen arbitrarily by moving piston 23 until it is near the end of cylinder 21, at which point the counter is adjusted to read zero. No adjustment of the counter is made during calibration and hence, $V_1$ and $V_4$ are established. In order to establish the value of $V_3$ and its equivalent scale reading $V_s$ and also $V_2$, the following procedure is employed.

An estimate is made of what the counter should read in terms of $V_s$ in order to obtain proper calibration (i.e., to satisfy $V_1 V_4 = V_2 V_3$). In other words, an estimated $V_s'$ (the prime is used to denote trial values) is chosen so that on movement of piston 22 from the fixed to the adjustable stop (through volume $V_1$ minus $V_2$) and of piston 23 (without any sample present) from $V_s'$ to zero scale reading, the differential indicator should register equalized pressures between the two chambers. Thus, after pressures between the two chambers have been equalized and valve 56 closed, piston 23 is moved inwardly until the counter reads zero and piston 22 is likewise moved inwardly and stop 36 adjusted until zero pressure differential between the two chambers is indicated. It is evident from the design and definition that $$V_s' = K(V_3' - V_4) \quad (8)$$

where $V_s'$ is the trial starting volume and K is the proportionality constant between volume change on the balance side and a change in counter reading.

From a derivation similar to that used for Equation 3

$$\frac{V_4}{V_3} = \frac{V_2}{V_1}$$

we may write:

$$\frac{V_4}{V_3'} = \frac{V_2'}{V_1} \quad (9)$$

Next, a second test is made with the same trial value of $V_s'$ and with a precision test block of accurately known volume, $V_c$, in the sample cup. Thus, the piston 22 is moved from stop 35 to stop 36 while piston 23 is moved from the starting number $V_s'$ inwardly until a pressure balance is indicated to obtain a counter reading $V_i'$. If the starting $V_s'$ were fortunately chosen to be exactly equal to the true starting number of $V_s$, then $V_i'$ will be an accurate reflection of the known volume $V_c$. However, such a fortunate choice seldom happens and the procedure outlined below permits the arrival at a true $V_s$ without any further trial.

Thus, from the pressure balance Equation 6

$$V_B = \frac{V_1 - V_2}{V_1} V_x = \frac{V_3 - V_4}{V_3} V_x$$

previously developed, it is evident that $$V_i = K \frac{V_3' - V_4}{V_3'} V_c \quad (10)$$

or $$V_i' = \frac{V_s'}{V_3'} V_c \quad (11)$$

$V_c$ is known as is $V_i$ from the test. For proper calibration, a relationship must be derived to give the proper starting number of $V_s$ in terms of $V_c$ and $V_s'$ and the now known incorrect indication $V_i'$. The equations may be written in terms of the values that must exist for an exact indication. From Equation 6

$$V_B = \frac{V_1 - V_2}{V_1} V_x = \frac{V_3 - V_4}{V_3} V_x$$

and Equation 7

$$V_i = K \frac{V_1 - V_2}{V_1} = K \frac{V_3 - V_4}{V_3} = V_x$$

we write:

$$V_i = K V_B = K \frac{V_3 - V_4}{V_3} V_c = V_c \quad (12)$$

By design:

$$V_s = K(V_3 - V_4) \quad (13)$$

From Equations 12 and 13

$$V_s = V_3 \quad (14)$$

and $$V_4 = V_s \frac{K-1}{K} \quad (15)$$

Substituting Equations 15 and 11 into Equation 10, $$V_i = \frac{K[V_s' V_c / V_i - V_s(K-1)/K]}{V_s'/V_i'} \quad (16)$$

and the above may be put into the form:

$$V_s - V_s' = \frac{K \dfrac{V_i - V_c}{V_i'}}{1 - K \dfrac{V_c}{V_i'}} \quad (17)$$

The above may also be put in the form of $$V_s = \frac{V_s'}{1 - K \dfrac{(V_i - V_c)}{V_i}} \Big/ 1 - K \dfrac{(V_c)}{V_i'} \quad (17a)$$

from which the true starting value of $V_s$ can be readily calculated. It will be noted that this equation does not involve any of the terms $V_1$ through $V_4$ except as these are incidentally required to calculate K. The calculation of K from approximate volumes of $V_1$ through $V_4$ results in a figure of sufficient accuracy that $V_s$ can be very accurately determined.

In the embodiment illustrated in FIGS. 1 and 2, K is very close to two. Therefore, the denominator of the right side of Equation 17 may be approximated by $$1 - 2\frac{V_c}{V_i'} = -1 \qquad (18)$$

Equation 17 may then be written:

$$\frac{V_s - V_s'}{V_s} = 2\frac{V_c - V_i'}{V_i'} \qquad (20)$$

This equation states that the ratio of error in the starting number to the starting number is approximately twice the error in indication to the indication. The correct starting number is therefore established and $V_2$ may be adjusted to give a pressure balance without sample and with the counter reading zero using the correct starting number of $V_s$ in adjusting stop 36. Thus, piston 22 is retracted against stop 35 and piston 23 set so that the correct starting number is indicated by the counter. The pressures of the two chambers are then equalized and the valve 56 closed. Thereafter, piston 23 is advanced until the counter reads zero and piston 22 advanced until the pressure is equalized between the two chambers. Stop 36 can then be adjusted to prevent the piston 22 from moving past this position in future operations.

It has been found that the procedure above described makes it possible to calibrate the instrument to read, on a counter graduated to hundredths of a cubic centimeter, the volume of a sample to a proportional accuracy of better than 0.1 percent by setting only one threaded adjustment after a single trial run on an accurately known sample. Two volumes are brought into proper proportion with two existing volumes to substantially eliminate proportionality errors regardless of their cause and without requiring exact measurement or knowledge of any of the four volumes involved.

Zero Error Correction

As indicated above, even a properly calibrated instrument will develop zero error or drift to such an extent that entirely inaccurate results are obtained. By zero error is meant deviation of the counter or scale reading from zero when piston 23 has been advanced to a balanced pressure position with no sample present. The drift or zero error can be due to a number of causes, some of which are not known. It may be due to dimensional changes with temperature, adsorption effects, foreign matter causing a volume change, or the volume equivalent of a difference in humidity between chambers A and B. The zero adjustment procedure to correct small errors which may occur in $V_1$, $V_2$, $V_3$ or $V_4$ is accomplished in accordance with this invention, by noting the error in counter reading $\Delta V_i$ which occurs at pressure balance with no sample present and shifting the relative position of the counter by an amount $\Delta C$ where $$\Delta C = K \Delta V_i \qquad (21)$$

Where K is as previously defined, $$K = \frac{V_i}{V_1 - V_2} \qquad (22)$$

Thus, piston 22 is moved from its fixed to its adjustable stop and piston 23 is moved from the true starting number $V_s$ until the pressure is balanced. For example, if the counter reading is $-999.93$ instead of zero in this position and $K=2$, there is an error of $-.07$. In such case, the slotted nut 47 is rotated until the counter reads $+.07$, a total correction of 0.14.

It is also evident that shift in relative position of the counter scale corresponds to a change in both $V_3$ and $V_4$ if the same starting number $V_s$ is used and that:

$$\Delta C = K \Delta V_3' = K \Delta V_4' \qquad (23)$$

where $\Delta V_3'$ and $\Delta V_4'$ are changes in volume resulting from the correction of $\Delta C$. The indicated error $\Delta V_i$ is related to the error in $V_B$ before correction by $$\Delta V_i = K \Delta V_B \qquad (24)$$

If the above correction is applied, the result is to change both $V_3$ and $V_4$ by an amount equal to $K \Delta V_B$ since from Equations 21, 23 and 24:

$$\Delta V_3' = \Delta V_4' = \frac{\Delta C}{K} = \Delta V_i' = K \Delta V_B \qquad (25)$$

Equations 4 and 5 may be put in the form:

$$\frac{V_1}{V_2} = \frac{V_3 - V_x}{V_B + V_4 - V_x} \qquad (26)$$

and this may be rewritten:

$$V_B = V_x - V_4 + \frac{V_2}{V_1}V_3 - \frac{V_2}{V_1}V_x = f(V_1, V_2, \text{etc.}) \qquad (27)$$

We now allow all volumes except $V_x$, which is fixed, to vary an amount $V_1 + \Delta V_1$, $V_2 + \Delta V_2$, etc. and define the exact differential:

$$\Delta V_B = \frac{\partial f}{\partial V_1}\Delta V_1 + \frac{\partial f}{\partial V_2}\Delta V_2, \text{ etc.} \qquad (28)$$

The balance volume will then become:

$$V_B' = V_B + \Delta V_B = V_x - V_4 + \frac{V_2}{V_1}V_3 - \frac{V_2}{V_1}V_x + \Delta V_B \qquad (29)$$

If the zero adjustment is made as described, the effect is to add the following to both $V_3$ and $V_4$ in the above equation:

$$\Delta V_3' = \Delta V_4' = \frac{V_1}{V_1 - V_2}\Delta V_B \qquad (30)$$

The resulting value for the new $V_B''$ is obtained by substituting Equation 30 into Equation 29 as follows:

$$V_B'' = V_x - V_4 - \frac{V_1}{V_1 - V_2}\Delta V_B + \frac{V_2}{V_1}V_3 + \frac{V_1}{V_1 - V_2}\Delta V_B$$
$$- \frac{V_2}{V_1}V_x + \Delta V_B \qquad (31)$$

$$V_B'' = V_x - V_4 + \frac{V_2}{V_1}V_3 - \frac{V_2}{V_1}V_x = V_B \qquad (32)$$

It will thus be seen that small errors are eliminated by the zero correction procedure regardless of their source. It can be shown that adjustments for errors in $V_3$ and $V_4$ cause no change in proportionality. A substantial change in the ratio of $V_1$ and $V_2$, however, causes a change in proportionality which, once detected, may be readily corrected by the calibration procedure previously described.

It will be evident from the foregoing that the method of this invention is also applicable to pycnometers which operate by an expansion method; i.e., the gas in the chambers is expanded during a measurement rather than being compressed as above specifically described. In other words, the pistons initially are at their innermost positions in the cylinders when the sample is added and the pressures equalized and thereafter move outwardly of the cylinders to expand the gas therein after which a reading is taken. However, the above deviations, with suitable change of sign, still apply.

From the foregoing it will be seen that this invention is one well adapted to attain all of the ends and objects hereinabove set forth, together with other advantages which are obvious and which are inherent to the method.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In a method of operating a pycnometer wherein the unknown volume of a sample is determined using first and second variable volume chambers whose volumes are changed between initial values at which the specific volume of gas in the first chamber bears a given relationship to that of the gas in the second chamber, and final values at which the same specific volume relationship is maintained so that the change in volume of the first chamber is a measure of the sample volume, the steps comprising adjusting at least one of the final and initial volume values of the second chamber so that the same specific volume of gas relationship is maintained as the volume of the first chamber is changed from an estimated initial value to an arbitrarily selected zero value with no sample in the first chamber, placing a sample of known volume in the first chamber, changing the volume of the second chamber from its initial to its final value, changing the volume of the first chamber from said estimated initial value to a value at which said specific volume relationship is re-established, changing the estimated initial volume value of the first chamber to a true initial value in accordance with the formula $$V_s = \frac{V_s'}{1 - K\frac{(V_i - V_c)}{V_i}}{1 - K\frac{(V_c)}{V_i'}}$$

wherein $V_s$ is the true initial value, $V_s'$ is the estimated initial value, $K$ is a proportionality constant between volume change and change in scale reading calculated from approximate initial and final volumes of the first chamber, $V_i$ is the scale reading corresponding to the final volume of the first chamber, and $V_c$ is the accurately known volume of the sample, removing the sample and adjusting the final volume value of the second chamber to re-establish said specific volume relationship while the first chamber is at said selected zero value.

2. In a method of operating a pycnometer wherein the unknown volume of a sample is determined using first and second variable volume chambers whose volumes are changed between initial and final values which comprises adjusting a volume indicating means associated with the first chamber to a zero reading while the volume of the first chamber is at its final value, selecting an estimated starting reading for the indicating means estimated to be a measure of the change in volume of the first chamber between its initial and final volume values, establishing a predetermined relationship between the specific volumes of gas in each chamber while the chambers are at their initial volume value, changing the volume of the first chamber from its initial to its final value, changing the volume of the second chamber from its initial to a final volume at which said predetermined specific volume gas relationship is again established, placing a sample of known volume in the first chamber, changing the volume of the second chamber to its final value, changing the volume of the first chamber from its initial value to a read-out value at which the predetermined specific volume relationship of gas in the chambers is re-established, changing the estimated starting reading to a true starting reading in accordance with the formula $$V_s = \frac{V_s'}{1 - K\frac{(V_i - V_c)}{V_i}}{1 - K\frac{(V_c)}{V_i'}}$$

wherein $V_s$ is the true initial value, $V_s'$ is the estimated initial value, $K$ is a proportionality constant between volume change and change in scale reading calculated from approximate initial and final volumes of the first chamber, $V_i$ is the scale reading corresponding to the final volume of the first chamber, and $V_c$ is the accurately known volume of the sample, and adjusting the final volume of the second chamber to be such that when the volume change of the first chamber, without a sample being present, is from said true starting reading to said zero reading, said specific volume gas relationship is re-established.

3. In a method of operating a pycnometer wherein the unknown volume of a sample is determined using first and second variable volume chambers whose volumes are changed between initial values at which the specific volume of gas in the first chamber bears a given relationship to that of the gas in the second chamber, and final values at which the same specific volume relationship is maintained so that a reading representing the difference in final values of the first chamber with and without a sample present is an indication of the volume of the sample, the steps of adjusting at least one of the final and initial volume values of the second chamber so that the same specific volume of gas relationship is maintained as the volume of the first chamber is changed from an estimated initial value to a selected zero value with no sample present in the first chamber and as the volume of the second chamber is correspondingly changed from its initial to its final value, placing a sample of known volume in the first chamber, changing the volume of the second chamber from its initial to its final value, changing the volume of the first chamber from said estimated initial value to a value at which said specific volume gas relationship is re-established, changing the estimated initial volume value of the first chamber to a true initial value in accordance with the formula $$V_s = \frac{V_s'}{1 - K\frac{(V_i - V_c)}{V_i}}{1 - K\frac{(V_c)}{V_i'}}$$

wherein $V_s$ is the true initial value, $V_s'$ is the estimated initial value, $K$ is a proportionality constant between volume change and change in scale reading calculated from approximate initial and final volumes of the first chamber, $V$ is the scale reading corresponding to the final volume of the first chamber, and $V_c$ is the accurately known volume of the sample, removing the sample, adjusting the final volume value of the second chamber to re-establish said specific volume gas relationship while the first chamber is at said selected zero value, thereafter changing the volume of the second chamber from its initial to its final value, changing the volume of the first chamber from its initial value to a value at which the said specific volume gas relationship is established to obtain a final reading, and changing the original zero reading by an amount equal to $K$ times the deviations of said final reading from the original zero reading, wherein $K$ is as defined in $$K = \frac{V_1}{V_1 - V_2} = \frac{V_3}{V_3 - V_4}$$

wherein $V_1$ is the initial volume of the second chamber, $V_2$ is the final volume of the second chamber, $V_3$ is the initial volume of the first chamber, and $V_4$ is the final volume of the first chamber, the values of $V_1$, $V_2$, $V_3$ and $V_4$ being known only approximately.

4. A method for determining an unknown volume using first and second variable volume chambers which comprises adjusting a scalar volume indicating means associated with a first chamber to read a predetermined value while the first chamber is at one extreme of its volume, selecting an estimated starting reading for the indicating means representative of the volume of the first chamber when it is at its other volume extreme, equalizing the pressure in the chambers while they are both at one volume extreme, changing the volume of the first chamber from one extreme to the other, changing the volume of the second chamber until the pressures in the chambers are again equalized, placing a sample of known volume in the first chamber, changing the volume of the second chamber by an amount equal to the change therein when the sample was absent, adjusting the volume of the first chamber until the pressures of the two chambers are again equalized, changing the estimated starting reading to a true starting reading in accordance with the formula $$V_s = \frac{V_s'}{\frac{1 - K\frac{(V_i - V_c)}{V_i}}{1 - K\frac{(V_c)}{V_i'}}}$$

wherein $V_s$ is the true initial value, $V_s'$ is the estimated initial value, K is a proportionality constant between volume change and change in scale reading calculated from approximate initial and final volumes of the first chamber, $V_i$ is the scale reading corresponding to the final volume of the first chamber, and V is the accurately known volume of the sample, adjusting the volume change of the second chamber to be such that when the volume change of the first chamber without a sample present is from the true starting reading to said predetermined value, pressures of the two chambers are equalized and thereafter, upon the reading varying from said predetermined value when the first chamber is at said one extreme of its volume with no sample present, sliding the scale of the indicating means by an amount equal to K times the deviation from the predetermined value wherein K is as defined in $$K = \frac{V_1}{V_1 - V_2} = \frac{V_3}{V_3 - V_4}$$

wherein $V_1$ is the initial volume of the second chamber, $V_2$ is the final volume of the second chamber, $V_3$ is the initial volume of the first chamber, and $V_4$ is the final volume of the first chamber, the values of $V_1$, $V_2$, $V_3$ and $V_4$ being known only approximately.

5. In a method of operating a pycnometer wherein the unknown volume of a sample is determined by changing the volume of a reference chamber between established limits and by varying the volume of a sample chamber between initial and read-out values so that the specific volumes of gas in the sample chamber at its initial and read-out values are respectively equal to the specific volume of gas in the reference chamber at its established volume limits, the steps of establishing a scale indicative of changes in the volume of the sample chamber with a selected zero value on the scale corresponding to the read-out volume of the sample chamber with no sample present, and thereafter shifting the scale by an amount equal to K times the deviation of a subsequent read-out value with no sample present from said selected zero value where K is as defined in $$K = \frac{V_1}{V_1 - V_2} = \frac{V_3}{V_3 - V_4}$$

wherein $V_1$ is the initial volume of the second chamber, $V_2$ is the final volume of the second chamber, $V_3$ is the initial volume of the first chamber, and $V_4$ is the final volume of the first chamber, the values of $V_1$, $V_2$, $V_3$ and $V_4$ being known only approximately.

6. In a method for operating a pycnometer wherein an unknown volume of a sample is determined by introducing the sample into a first variable volume chamber containing gas at a specific volume having a given relationship to specific volume of gas in a second variable volume chamber at initial volumes of both chambers; changing the initial volumes of both chambers to final volumes at which the same specific volume relationship is maintained; measuring the change in volume of the first chamber on a scaling device having a zero point corresponding to such final volume of said first chamber with no sample present therein, thereby obtaining a measurement having relationship to volume of the sample; the steps comprising changing the volumes of both chambers from said initial volumes to final volumes with no sample present in said first chamber; obtaining a check final reading deviating from the zero point for said first chamber; and shifting the scale of the scaling device by an amount equal to K times the deviation of the check final reading from the zero point, K being defined as $$K = \frac{V_1}{V_1 - V_2} = \frac{V_3}{V_3 - V_4}$$

where $V_1$ is the initial volume of the second chamber, $V_2$ is the final volume of the second chamber, $V_3$ is the initial volume of the first chamber, and $V_4$ is the final volume of the first chamber, $V_1$, $V_2$, $V_3$ and $V_4$ being only approximately known.

7. In a method for operating a pycnometer wherein an unknown volume of a sample is determined by introducing said sample into a first variable volume chamber containing gas at a pressure equal to pressure of gas contained in a second variable volume chamber at initial volumes of both chambers, changing the initial volumes of both chambers to final volumes at which the pressures are again equal, measuring the change in volume of the first chamber on a scaling device having a zero point corresponding to such final volume of the first chamber with no sample present therein, thereby obtaining a measurement having relationship to volume of the sample, and the zero point becomes erroneous; the steps of correcting for zero error comprising changing the volumes of both chambers from initial volumes to final volumes with no sample present in the first chamber; obtaining a check final reading deviating from the zero point for said first chamber and shifting the scale of the scaling device by an amount equal to K times the deviation of the check final reading from the zero point, K being defined as $$K = \frac{V_1}{V_1 - V_2} = \frac{V_3}{V_3 - V_4}$$

where $V_1$ is the initial volume of the second chamber, $V_2$ is the final volume of the second chamber, $V_3$ is the initial volume of the first chamber, and $V_4$ is the final volume of the first chamber, the values of $V_1$, $V_2$, $V_3$ and $V_4$ being only approximately known.

8. The method of claim 7 wherein the initial volumes of the chambers are twice as great as the final volumes and K is equal to 2.

References Cited in the file of this patent
UNITED STATES PATENTS 2,647,394    Schaeperklaus            Aug. 4, 1953
2,849,881    Anderson               Sept. 2, 1958

OTHER REFERENCES

Publication: Review of Scientific Instruments, Vol. 31, November 1960, pages 1234–1237, article by Wiegand et al.